(12) United States Patent
Sheftel et al.

(10) Patent No.: US 10,904,427 B2
(45) Date of Patent: Jan. 26, 2021

(54) COORDINATED CINEMATIC DRONE

(71) Applicant: Blueprint Reality Inc., Vancouver (CA)

(72) Inventors: Benjamin James Sheftel, Vancouver (CA); Tryon Williams, West Vancouver (CA)

(*) Notice: Subject to any disclaimer, the term of this patent is extended or adjusted under 35 U.S.C. 154(b) by 0 days.

(21) Appl. No.: 16/148,029

(22) Filed: Oct. 1, 2018

(65) Prior Publication Data
US 2019/0104250 A1  Apr. 4, 2019

Related U.S. Application Data

(60) Provisional application No. 62/565,926, filed on Sep. 29, 2017.

(51) Int. Cl.

| | | |
|---|---|---|
| *H04N 5/232* | (2006.01) | |
| *G06T 15/20* | (2011.01) | |
| *B64C 39/02* | (2006.01) | |
| *G05D 1/00* | (2006.01) | |
| *G05D 1/10* | (2006.01) | |
| *G08G 5/00* | (2006.01) | |
| *G08G 5/04* | (2006.01) | |

(Continued)

(52) U.S. Cl.
CPC ....... *H04N 5/23222* (2013.01); *B64C 39/024* (2013.01); *B64D 47/08* (2013.01); *G05D 1/0094* (2013.01); *G05D 1/104* (2013.01); *G06T 15/20* (2013.01); *G08G 5/006* (2013.01); *G08G 5/0013* (2013.01); *G08G 5/0026* (2013.01); *G08G 5/0039* (2013.01); *G08G 5/0043* (2013.01); *G08G 5/0069* (2013.01); *G08G 5/04* (2013.01); *G08G 5/045* (2013.01); *H04N 5/2224* (2013.01); *H04N 5/2228* (2013.01); *H04N 5/23203* (2013.01); *H04N 5/23299* (2018.08); *H04N 5/247* (2013.01); *B64C 2201/027* (2013.01); *B64C 2201/108* (2013.01); *B64C 2201/127* (2013.01); *B64C 2201/143* (2013.01); *G06T 19/006* (2013.01); *G06T 2210/21* (2013.01); *H04N 5/272* (2013.01)

(58) Field of Classification Search
CPC ............ H04N 5/2322; H04N 5/23299; H04N 5/2224; H04N 5/2228; H04N 5/23203; H04N 5/247; H04N 5/272; B64C 39/024; B64C 2201/027; B64C 2201/108; B64C 2201/27; B64C 2201/143; B64D 47/08; G05D 1/0094; G05D 1/104; G05T 15/20; G08G 5/0013; G08G 5/0026; G08G 5/0039; G08G 5/0043; G08G 5/006; G08G 5/0069; G08G 5/04; G08G 5/045; G06T 19/006; G06T 2210/21
USPC ........................................................ 348/144
See application file for complete search history.

(56) References Cited

U.S. PATENT DOCUMENTS

| | | | |
|---|---|---|---|
| 2016/0068207 A1* | 3/2016 | Moyart | ................ E05C 21/005 269/47 |
| 2018/0046187 A1* | 2/2018 | Martirosyan | ........ G05D 1/0094 |

(Continued)

*Primary Examiner* — Michael Lee

(57) ABSTRACT

A camera is mounted on a drone, which is programmed to follow a flight path that is specified by trajectory parameters. The position of the drone is coordinated with a subject to be filmed by the camera, and may be coordinated with the position of one or more objects, including other automatically controlled drones, a manually controlled drone and virtual assets. The drone can also be coordinated with the behavior of a subject.

20 Claims, 5 Drawing Sheets

(51) Int. Cl.
    *H04N 5/222*     (2006.01)
    *H04N 5/247*     (2006.01)
    *B64D 47/08*     (2006.01)
    *H04N 5/272*     (2006.01)
    *G06T 19/00*     (2011.01)

(56) References Cited

U.S. PATENT DOCUMENTS

2018/0174270 A1*   6/2018   Burgess .................. G06T 7/593
2018/0348766 A1*  12/2018   Lewis .................... B64C 39/024

* cited by examiner

COORDINATED CINEMATIC DRONE

CROSS-REFERENCE TO RELATED APPLICATIONS

This application claims the benefit of U.S. provisional patent application Ser. No. 62/565,926, filed on Sep. 29, 2017, which is incorporated by reference herein in its entirety.

TECHNICAL FIELD

The present invention relates to the field of computer-assisted cinematography. More specifically, it relates to the use of a camera-carrying drone that flies on a path coordinated with a subject and real or virtual objects.

BACKGROUND

Virtual reality (VR), augmented reality (AR) and mixed reality (MR) are technologies where the interface between the real physical world and the digital world is developed in an effort to improve the communication between humans and technology, and to create more immersive digital worlds.

In particular, mixed reality technology is the most recent advancement in the field of immersive technology, wherein content from the digital and physical worlds can interact with each other. The concept of mixed reality was first introduced in 1994 by Paul Milgram and Fumio Kishino. It could be defined as a way of creating new technological environments and functionalities from the interaction of physical and digital objects.

In various industries such as the movie industry and the video game industry, the implementation of mixed reality technology is the source of new economic markets. Indeed, the economic success of these industries, in particular the video games industry, is greatly tied to technological advancements and more immersive interaction between the user/spectator and the game/movie. More specifically, the combination of computer processing, human input and environmental input in order to improve the immersive experience of the user is at the center of this technological advancement.

Moreover, new applications and functionalities may be created by the implementation of mixed reality technology in the social communication field. For example, collaboration may be established between workers regardless of their location. Multiple new applications of this technique can be developed and thus enhance the way people interact with each other and improve their daily life.

Mobile devices, televisions and monitors are the primary global medium for communication. However, virtual reality and augmented reality experiences are very difficult to communicate via mobile devices and televisions. The advent of mixed reality allows us to communicate the virtual world to a 2D screen.

Immersive computing has enabled advances in virtual cinematography which radically change the way filmmaking can be done. As such, it is becoming more and more important for the traditional 2D filmmaking industry to pay heed to the growing field of immersive computing, otherwise there is the risk that such filmmaking will lose popularity.

Many tools are available today to assist with the production and enjoyment of immersive video, such as VR headsets, controllers, motion trackers that can be worn or attached to a device, tracked cameras, depth cameras, chromakeying, static subtraction, post-processing software and ever increasing computing power. However, the post-production of mixed reality is expensive, time consuming, and it does not provide for on-the-fly iteration or any immediate feedback loop.

Mixed reality has uses in e-sports, live performances, virtual reality arcades, video production, communication and business.

Camera movement and cinematic shots are presently limited by physical and mechanical constraints, and need significant man-power to operate. The analog control afforded to human operators of cameras is also imprecise and not replicable.

This background information is provided to reveal information believed by the applicant to be of possible relevance to the present invention. No admission is necessarily intended, nor should be construed, that any of the preceding information constitutes prior art against the present invention.

SUMMARY OF INVENTION

A camera-carrying drone flies on a path coordinated with other such drones, or other real or virtual objects, while it is also coordinated with a subject that it is filming, such as an actor, presenter, performer or interviewee. The drone can also be coordinated with other drones that are manually controlled and are also filming the subject. In most cases, the subject is filmed in front of a background that is to be removed, and an image of the subject is composited into a VR scene or 3D model of a real scene.

Using one or more quadcopter drones, one or more subjects can be recorded by a mounted camera with specific placement, motion and parameters driven by data fed from an onboard or networked computing device such as a PC.

An advantage of a coordinated cinematographic drone is that it has fewer mechanical and physical constraints compared to traditional manually controlled or crane-mounted cameras, which makes for fewer obstructions on the filming set. Another advantage may be that less man-power is needed to create the same amount of footage compared to traditional filming techniques. Another advantage is that the use of applied mathematics to control a flight path of a drone, and hence camera position and angle, allows for more controllable and replicable operation of cameras compared to cameras that are manually operated.

By allowing motion of the drones to be determined dynamically with a management routine, the drones can automatically avoid conflicting trajectories and schedule events more intelligently, such as camera events or events in the drone's motion.

The use of coordinated drones allows for cinematic effects, which would be infeasible if not impossible to perform even with highly professional auxiliary staff. As the need for mechanical support is eliminated, and with much more precise and smooth dynamics, strong computer-driven motion can potentially provide a significant increase in available cinematic techniques.

Contextual information about the actors, drones, or digital content being composited can be fed back into a data model through sensors such as VR positional and rotational tracking or depth information sensors. Such information can be processed to recognize conditions that can trigger automatic camera reactivity, such as detecting the subject pick up an object and having the front-facing drone dip down and in for a close-up.

Especially with cinematographic techniques that incorporate digital content, having a human analyze conditions on the fly for cinematic cues is unrealistic, while an automated process is much more capable.

Embodiments of the present invention provide one or more of the above advantages.

Disclosed herein is a method for videoing a subject comprising the steps of: programming a drone with a trajectory parameter, the drone carrying a video camera; coordinating the drone with the subject; determining a flight path for the drone that is defined by the trajectory parameter; adjusting the flight path of the drone to avoid a collision with a further drone carrying a further camera, the further drone being coordinated with the subject; and filming the subject with the camera while the drone is flying on the adjusted flight path.

Also disclosed herein is a computer readable medium comprising computer readable instructions which, when executed by one or more processors, cause the processors to: program a drone with a trajectory parameter, the drone carrying a video camera; coordinate the drone with a subject; determine a flight path for the drone that is defined by the trajectory parameter; adjust the flight path of the drone to avoid a collision with a further drone carrying a further camera, the further drone being coordinated with the subject; and control the camera to film the subject while the drone is flying on the adjusted flight path.

Further disclosed herein is a system for videoing a subject comprising: a drone programmed with a trajectory parameter, wherein the drone is coordinated with a subject; a video camera on the drone; a computer readable memory storing a flight path for the drone that is defined by the trajectory parameter; and a further drone carrying a further camera, the further drone being coordinated with the subject; wherein the flight path of the drone is adjusted to avoid a collision with the further drone; wherein the subject is filmed with the camera while the drone is flying on the adjusted flight path and while the further camera is filming the subject.

DESCRIPTION

A. Glossary

Figure 1:
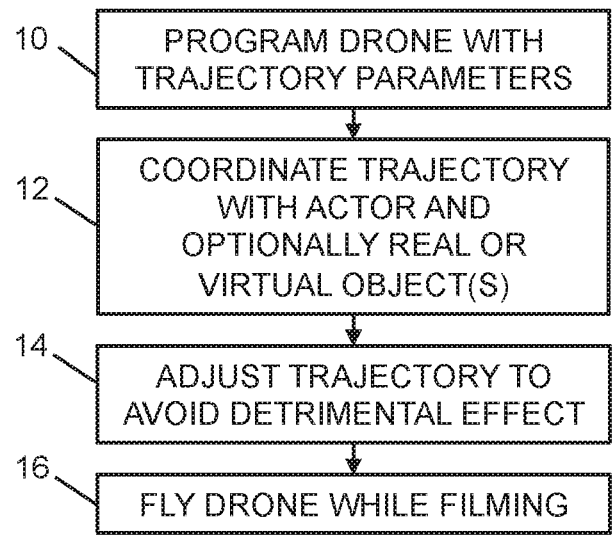
FIG. 1 is a flowchart of the main steps of a process for coordinating a cinematographic drone, according to an embodiment of the present invention.

The term "augmented reality (AR)" refers to a view of a real-world scene that is superimposed with added computer-generated detail. The view of the real-world scene may be an actual view through glass, on which images can be generated, or it may be a video feed of the view that is obtained by a camera.

The term "virtual reality (VR)" refers to a scene that is entirely computer-generated and displayed in virtual reality goggles or a VR headset, and that changes to correspond to movement of the wearer of the goggles or headset. The wearer of the goggles can therefore look and "move" around in the virtual world created by the goggles.

The term "mixed reality (MR)" refers to the creation of a video of real-world objects in a virtual reality scene. For example, an MR video may include a person playing a virtual reality game composited with the computer-generated scenery in the game that surrounds the person.

The term "image" is generally used herein to refer to a moving image, such as a video or movie. The term "video imagery" is used more generally to refer to one or more video images that are taken of the same subject, such as an actor.

The term "module" can refer to any component in this invention and to any or all of the features of the invention without limitation. A module may be a software, firmware or hardware module, and may be located in a user device, camera, tracker, controller, headset or a server.

The term "network" can include both a mobile network and data network without limiting the term's meaning, and includes the use of wireless (e.g. 2G, 3G, 4G, WiFi, WiMAX™, Wireless USB (Universal Serial Bus), Zigbee™, Bluetooth™ and satellite), and/or hard wired connections such as local, internet, ADSL (Asymmetrical Digital Subscriber Line), DSL (Digital Subscriber Line), cable modem, T1, T3, fibre, dial-up modem, television cable, and may include connections to flash memory data cards and/or USB memory sticks where appropriate. A network could also mean dedicated connections between computing devices and electronic components, such as buses for intra-chip communications.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by an application, code or a module. The processor, if comprised of multiple processors, may be located together or geographically separate from each other. The term includes virtual processors and machine instances as in cloud computing or local virtualization, which are ultimately grounded in physical processors.

The term "real-time" is used to refer to the actual time at which an event or process occurs, subject to the unavoidable time-lag in the electronics used for capturing, processing, transmitting and displaying data and images.

The term "remote" or derivations of it are used to refer to locations that are physically separate from each other, such as in different countries, in different cities, in different buildings, or in different rooms in the same building, but not in the same room and not in the same outdoor location such as an outdoor set.

The term "subject" refers to a person to be filmed, such as an actor, presenter, interviewee, reporter or commentator. It may also refer to an animal or a real, inanimate object that is to be filmed.

The term "system" when used herein refers to a system for coordinating one or more drones that carry a cinematographic camera, the system being the subject of the present invention. The system in some embodiments includes the drones and the cameras.

B. Overview

Referring to FIG. 1, there are four main steps in a method for using a coordinated cinematographic drone while filming an actor. The same steps apply to filming other subjects. In step 10, a drone that carries a camera is programmed with trajectory parameters for its flight path. The trajectory parameters may be, for example, to fly in a straight line or fly the drone in an arc. Trajectory parameters may be absolute, relative or reactive. Trajectory parameters may be a sequence of any combination of absolute, relative and reactive parameters.

For example, absolute parameters include flying along a predefined line or arc, a complex arc, or even hovering at fixed coordinates. Relative parameters may include maintaining a set distance or set angle from a reference point (such as an actor), remaining above a certain distance from the reference point, or remaining at a fixed distance and/or angle from a virtual asset in a VR scene into which an image of an actor is composited. Reactive parameters may include lowering the position of the drone whenever an actor crouches down and dipping in for a close-up, or gradually moving in when an actor remains still, or reacting to any gesture or other behavior of the actor. Other examples of trajectory parameters will be evident to a person of skill in the art.

In step 12, the intended trajectory of the drone is coordinated with the actor, or a particular actor in a group of actors. Coordinating the drone with an actor may be as straightforward as aiming the camera on the drone at the actor for all points in the flight path of the drone. The trajectory of the drone may also be coordinated with other objects, such as another drone or a virtual object. By coordinating the drone with other real objects, collisions are avoided, and views of the actor blocked by other drones are avoided. By coordinating the drone with virtual objects, a more realistic perspective of the actor is captured for compositing into a VR scene containing the virtual objects.

As a result of coordinating the trajectory of the drone with other objects, whether real or virtual, the trajectory of the drone may need to be adjusted using predictive calculations, as shown in step 14, to avoid a detrimental effect such as a collision or less than optimal perspective of the actor. This is done automatically either by the drone or by a computer that controls the flight of the drone, and is done before the flight or in real time. If the trajectory does not need to be adjusted, then this step is omitted.

After the trajectory of the drone has been set, at least initially, the drone then flies while the camera it is carrying films the actor, in step 16. If the trajectory is relative or reactive, then its trajectory is adjusted in real time where necessary, as in step 14, as the actor moves. Also, if there is another, manually controlled drone present, its trajectory is likely to be unknown to the first drone, and so the first drone needs to automatically adjust its trajectory in real time in response to the position and/or speed of the manually controlled drone.

C. Exemplary Embodiments

Figure 2:
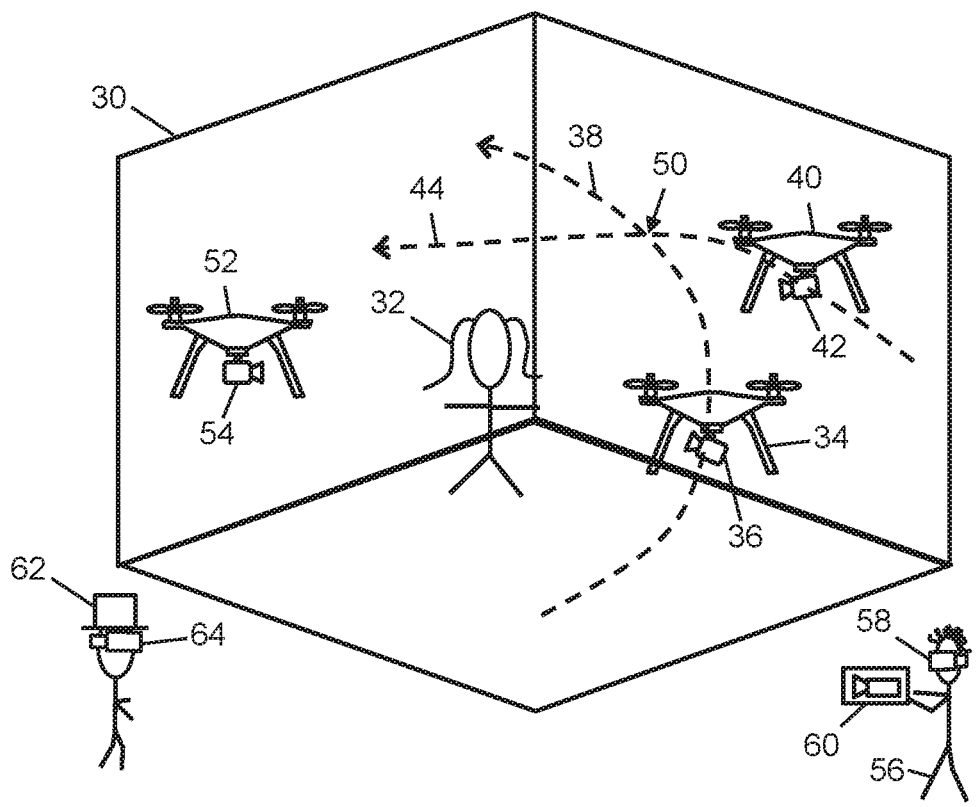
FIG. 2 is a schematic diagram showing a filming set that uses coordinated cinematographic drones, according to an embodiment of the present invention.

Referring to FIG. 2, a green screen set 30 is shown with actress 32, who is acting. Drone 34 carries camera 36, which is pointed at and filming the actress 32. Drone 34 is flying on path (or trajectory) 38 while filming the actress 32. Drone 40 carries camera 42, which is pointed at and filming the actress 32. Drone 40 is flying on path 44 while filming the actress 32. Point 50 represents a possible collision point between the two drones 34, 40. If the drones 34, 40 pass through the point 50 at different times, then there will not be a collision between them. However, if the drones 34, 40 are programmed with trajectory parameters that will take them both through point 50 at or about the same time, then one or both of the drones will take an avoidance action. The avoidance action in one embodiment is for one of the drones 34, 40 to slow down or wait while the other drone passes through the point 50. In another case, the avoidance action is for one of the drones 34, 40 to make a detour from its path so that it avoids passing through the point 50.

Also present in the green screen set 30 is a manually controlled drone 52 carrying camera 54, which is also filming the actress 32. The manually controlled drone is controlled by a cameraman 56 wearing a VR headset 58 and holding a controller 60. The cameraman 56 controls the flight of the drone 52 with the controller 60, and also controls aspects of the camera, such as zoom level and pointing direction. In cases where physical movement of the controller corresponds to relative physical movement of the drone 52, the movements in some embodiments are in a 1:1 ratio. In other embodiments, the movement of the drone 52 is magnified compared to movement of the controller 60, such as in a ratio of 1:10, which allows the cameraman 56 to obtain overhead shots of the actress 32 while standing on the floor. That is to say that the position of the drone 52 is a scaled response to the change in position of the controller 60. The headset 58 displays a VR scene to the cameraman 56, in which an image of the actress 32 is composited. The cameraman 56 can therefore film the actress 32 as if she were present in the VR world visible to the cameraman. While the cameraman 56 is shown in the vicinity of the green screen set 30, he may in other cases be located remotely from the green screen set.

A director 62 is also shown outside of the green screen set 30, and in some cases may even be located remotely from the green screen set. The director 62 is shown wearing a VR headset 64, which displays a different view (generally) of the same VR scene composited with an image of the actress 32. The director 62 is therefore able to instruct the cameraman 56 as to which views of the actress to capture.

Figure 3:
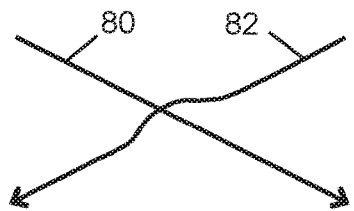
FIG. 3 is a diagram of coordinated drone paths that avoid a collision, according to an embodiment of the present invention.

Referring to FIG. 3, two drone paths 80, 82 are shown that avoid a collision. In this example, the drone on path 80 has priority and does not adjust its trajectory. However, the drone on path 82 adjusts its trajectory so that it does not intersect with path 80. This type of trajectory adjustment is employed in one or more embodiments of the present invention.

Figure 4:
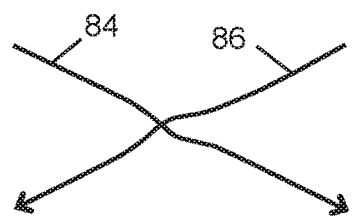
FIG. 4 is a diagram of alternative drone paths that avoid a collision, according to an embodiment of the present invention.

Referring to FIG. 4, two other drone paths 84, 86 are shown that avoid a collision. In this example, both drones adjust their trajectories so that they do not intersect with each other. This type of trajectory adjustment is employed in one or more embodiments of the present invention.

Figure 5:
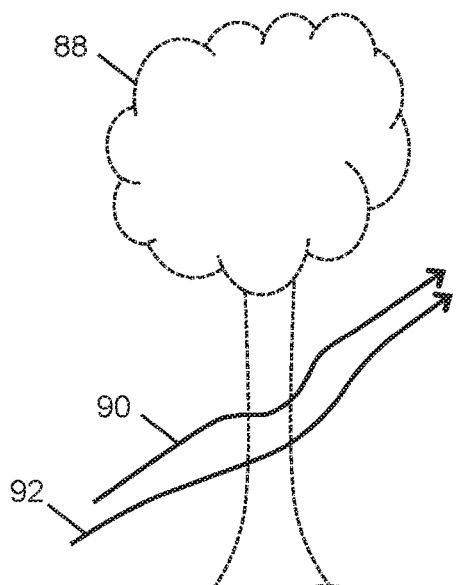
FIG. 5 is a diagram of drone paths that avoid a virtual collision with a virtual reality object, according to an embodiment of the present invention.

Referring to FIG. 5, a virtual tree 88 is shown. A first flight path 90 is shown which abruptly avoids the tree 88, by moving around the trunk fairly closely. A second flight path 92 is shown that avoids the tree 88 more smoothly. Either option can be included in the trajectory adjustment of the drones. By filming the actress 32 as if the virtual tree 88 were present in real life in the set 30, a more realistic perspective of the actress is captured by the camera on the drone that avoids the tree. Also, it would not make sense for a shot to be taken from inside the trunk of a tree, or any other solid object in the virtual scene (unless perhaps it is a translucent or transparent object such as water).

The paths of the drones can also be altered so that they pass to the side, above or below other virtual objects, rather than passing through them.

Figure 6:
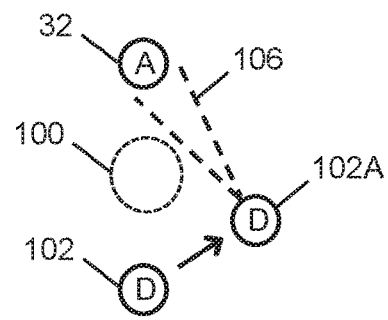
FIG. 6 is a schematic plan view of a drone deviating in its trajectory to avoid a virtual asset coming in the line of site between the camera and the subject, according to an embodiment of the present invention.

Referring to FIG. 6, the trunk 100 of a virtual tree is shown between the actress 32 and drone 102. While in real life the camera on drone 102 would capture an image of the actress, it would not be an optimal image for compositing into a VR scene, because such a view would be impossible. Instead, the drone 102 moves to position 102A so that the actress 32 is now in a field of view 106 of the camera carried by the drone, the field of view being clear of any virtual assets that are present in the VR world into which an image of the actress is composited. In other words, if the camera 102 at position 102A were in a corresponding position and orientation in the virtual world, its field of view to the image of the actress would be clear of all virtual assets. By filming the actress 32 as if the virtual tree trunk 100 were present in real life in the set 30, a more realistic perspective of the actress is captured by the camera 102.

Figure 7:
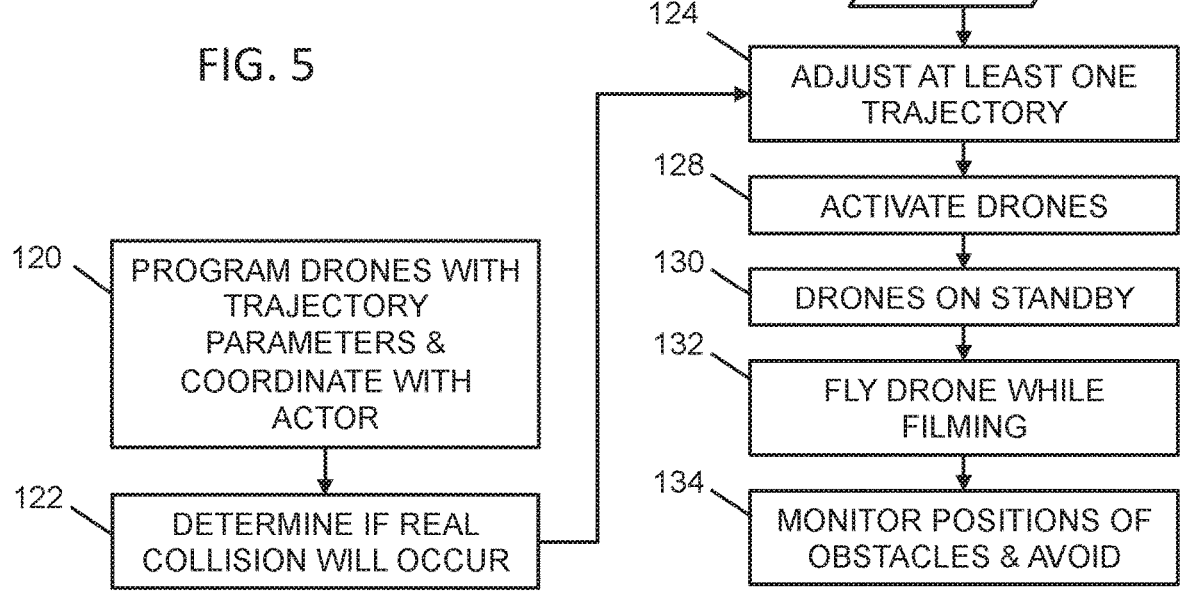
FIG. 7 is a flowchart of a process for avoiding collisions between drones, according to an embodiment of the present invention.

Referring to FIG. 7, a process for avoiding collisions between drones is shown. In step 120, multiple drones are programmed with trajectory parameters and coordinated with an actor. The director, for example, configures one or more behavior profiles for each drone to be used. These profiles can range from simple (e.g. stay directly above actor's head) to complex (e.g. when actor is crouching, match flight height to actor's head height and get as close to a straight on angle to the actor's face). As described above, trajectory parameters can take many varied forms.

In step 122, either the computer that controls the drones, or each drone individually determines if a real collision will occur if all the drones follow flight paths according to the trajectory parameters.

In step 124, assuming that it has been determined in the preceding step that a collision will occur, at least one of the trajectories of the drones is adjusted.

To determine which drone should have its trajectory adjusted, an input from a priority list 126 may be used, where each drone has been given a priority ranking. If two drones are expected to collide, then the one that has the lower priority will adjust its trajectory to avoid colliding with the other. If there is no priority, both drones take avoidance actions.

In step 128, the director activates the drones, which, in response, enter a standby phase in step 130 in which they are waiting for an Action command.

In step 132, the director triggers action by issuing the Action command, and the drones begin navigating spatially according to their behavior profiles while the actor performs. The action command may be given verbally by the director and detected by voice recognition software in the drones, or the director may, in conjunction with a voice command given to the actor, tap a button on a mobile computing device that triggers the drones via a wireless communications link. The drones are flown together, at the same time, while the camera on each drone films the actor from a different angle. The actor's performance is captured via the drone cameras and transmitted to a computing device, where the captured images are composited with digital content and saved.

As the flights of the drones continue, they each monitor the position of obstacles, in step 134, and invoke collision-avoidance maneuvers whenever necessary. Obstacles may be, for example, another manually controlled drone in the set or another actor.

The drones interact with each other and therefore exhibit collective behavior. If the drones themselves coordinate their trajectories with each other, rather than an external computing device, the drones are considered to be self-coordinating drones. With this collective behavior of the drones, it is possible to record footage of the actor(s) in a single take.

While the performance of the actress is occurring, the director may observe or swap the behavior of any drone. If the director is wearing a VR headset, he may also be presented with an immersive view of the digital scene, including a composited representation of the actor and representations of the drones.

Figure 8:
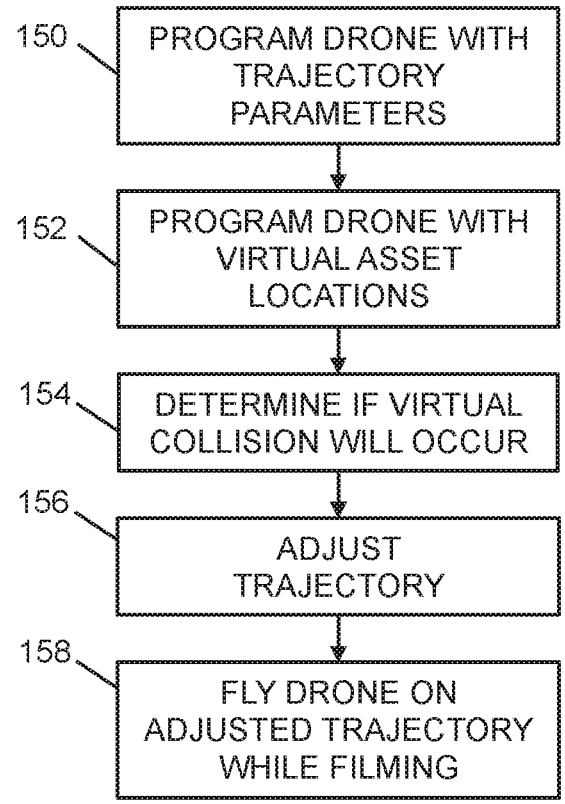
FIG. 8 is a flowchart of a process for avoiding virtual collisions, according to an embodiment of the present invention.

FIG. 8 is a flowchart for avoiding virtual collisions. In step 150 a drone is programmed with trajectory parameters for filming an actor. As described above, trajectory parameters can take many varied forms. In step 152, the drone is programmed with the locations and dimensions of the virtual assets in the VR scene into which an image of the actor is to be composited. In step 154, the drone determines whether it will undergo a virtual collision with a virtual asset, as if the virtual asset were real and in the same coordinate frame as the actor and drone. If a virtual collision is predicted, then the trajectory of the drone is adjusted in step 156. Then, in step 158, the drone flies on the adjusted trajectory while filming the actor.

Figure 9:
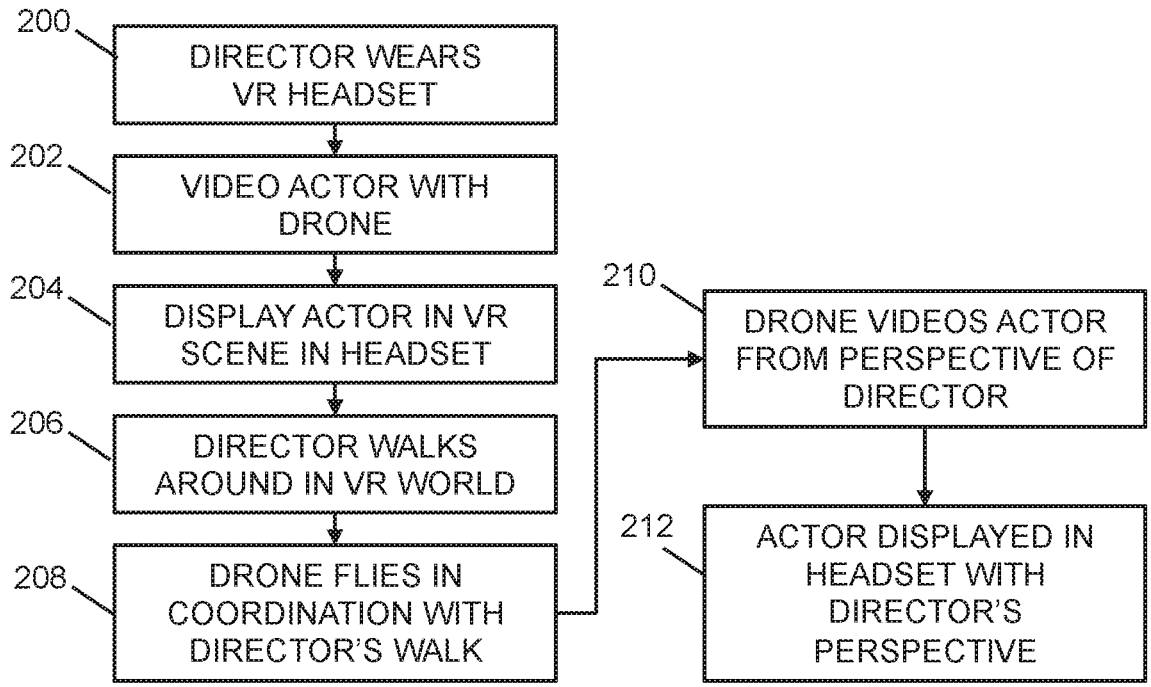
FIG. 9 is a flowchart of a process for videoing a subject from the perspective of an observer who is observing a composited MR scene with the subject, according to an embodiment of the present invention.

FIG. 9 is a flowchart for videoing a subject from the perspective of an observer who is observing a composited scene with the subject. This is made possible by controlling a drone in direct response to the position and orientation of a VR headset. In this example, the observer is a director, who puts on a VR headset in step 200 in order to observe a VR world. In step 202, an actor is videoed by a drone, the angle of the drone with respect to the actor corresponding to the director's angle of view of the actor image as composited in the VR world. In step 204, the composited image of the actor is displayed in the VR world in the director's headset. In step 206, the director walks around or physically moves otherwise. As the director moves, trackers in the VR headset that the director wears follow the movement of the headset and alter the view of the VR world displayed to the director accordingly. In step 208, the drone flies along a path in the real world that emulates the path of the director in the virtual world, while at the same time the camera carried by the drone tracks and videos the actor in step 210, from the perspective of the director as if the director were at the real location corresponding to his location in the virtual world. The drone is therefore coordinated with the director's point of view. By compositing an image that has been captured from the director's point of view, a more accurate representation of the actor can be added to the virtual world, compared to an image that is captured from another angle and then adjusted. In step 212, the composited image of the actor, from the director's point of view, is displayed in the virtual world in the director's headset.

Figure 10:
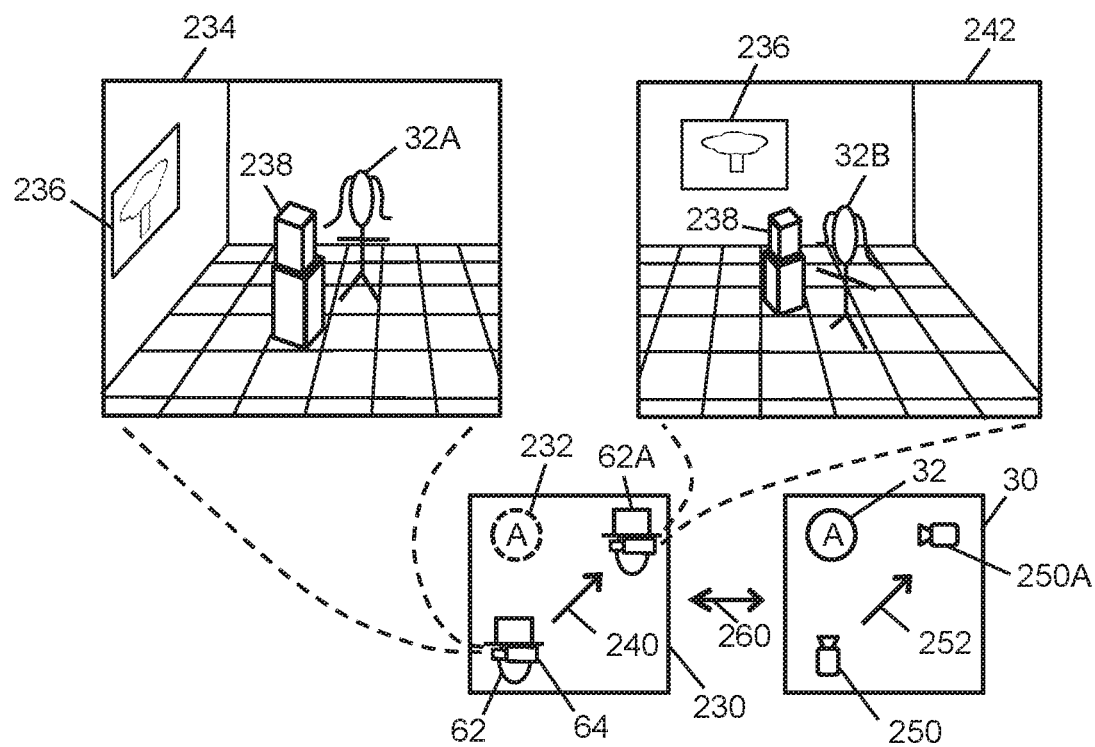
FIG. 10 is a schematic diagram representing the process of FIG. 9.

Referring to FIG. 10, a set-up is shown to which the process of FIG. 9 applies. Director 62 is shown present in location 230, which is close to or remote from the green screen set 30 in which the actress 32 is located. In the headset 64 that the director wears, a display 234 is shown of a VR scene that includes virtual objects 236, 238. Also displayed is an image 32A of the actress 32 composited into the VR scene. Location 232 represents the perceived location of the image 32A of the actress 32 relative to the real location of the director 62, as displayed to the director in his headset 64. The image 32A of the actress 32 is captured by camera 250 carried by a drone in the green screen set 30.

As the director 62 moves on path 240 from his initial position to new position 62A at location 230, the view displayed in the headset 64 of the director 62 changes from view 234 to view 242. View 242 shows a different image 32B of the actress 32 as captured by the camera 250 at position 250A. As the director moves to position 62A along path 240, the drone carrying the camera 250 moves in a corresponding path 252 to position 250A, while the camera angle is continually adjusted to always point at the actress 32. Signals from the headset 64 of the director 62 and camera 250 and its carrying drone are communicated between the location 230 and the region of the set 30 via two-way communications link 260.

Figure 11:
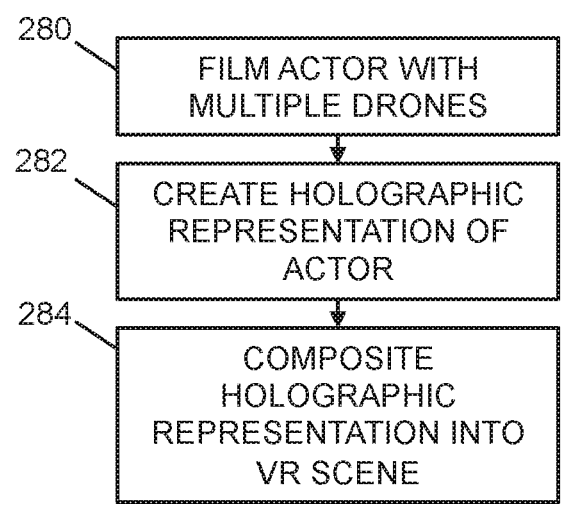
FIG. 11 is a flowchart of a process for creating a holographic representation of an actor using coordinated drones, according to an embodiment of the present invention.

FIG. 11 shows a process for creating a holographic representation of an actor using a system of coordinated drones. In step 280, the actor is filmed simultaneously with multiple cameras, each carried by a separate drone. In step 282, the system creates a holographic representation of the actor using the images captured by the multiple cameras. In step 282, the system composites the holographic representation of the actor into a VR scene.

D. Exemplary System

Figure 12:
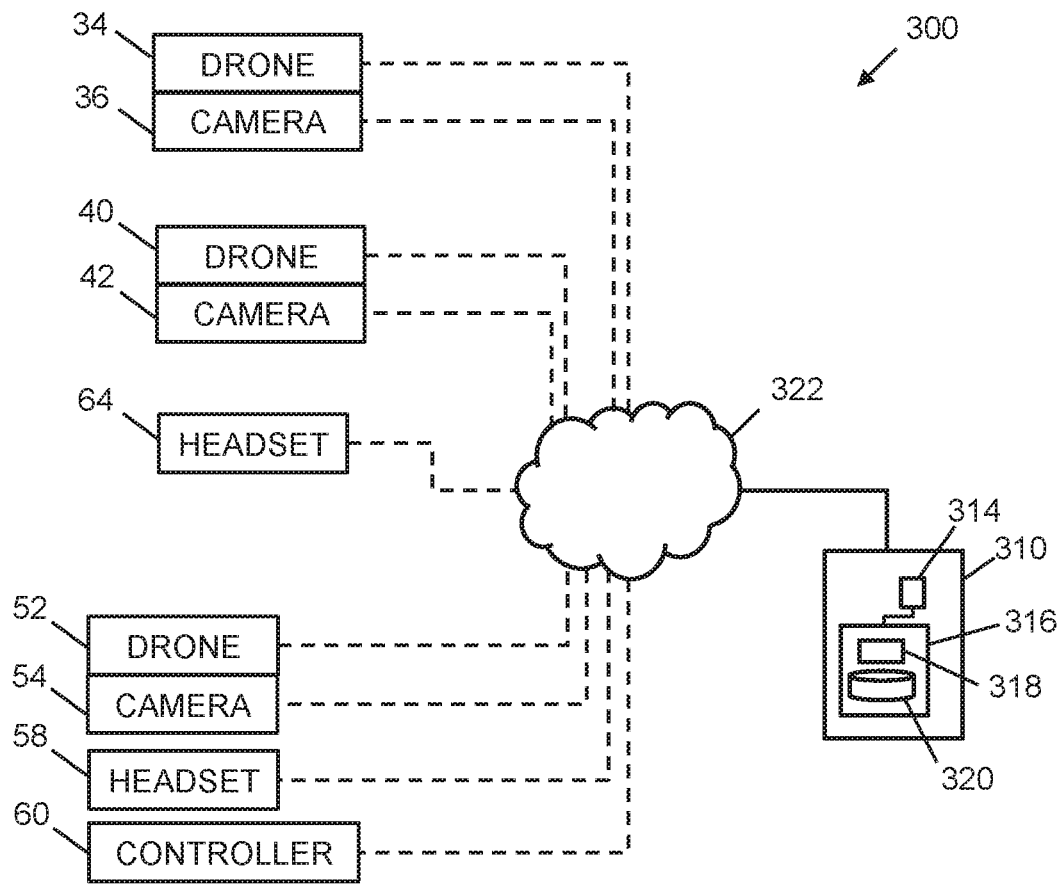
FIG. 12 is a block diagram of a system of coordinated drones according to an embodiment of the present invention.

FIG. 12 shows a system 300 of coordinated cinematographic drones. The system 300 includes a computing device 310, which may be desktop or gaming computer, for example, or any other electronic device that provides the necessary equivalent functionality to fulfill the requirements of the invention. The computing device 310 includes a processor 314 which is operably connected to computer readable memory 316 included in the computing device. The system 300 includes computer readable instructions 318 (e.g. an application) stored in the memory 316 and computer readable data 320, also stored in the memory. The memory 316 may be divided into one or more constituent memories, of the same or different types. The computing device 310 further includes interfaces operably connected to the processor 314, for connecting to external modules and devices. When the computer readable instructions 318 are executed by the processor 314, the processor performs the steps in one or more of the flowcharts disclosed herein.

Various components are connected to the computing device 310 via wireless connections, which may pass through a wireless network 322 depending on the embodiment. Connected to the computing device 310 is a first camera 36 and first drone 34, which carries the first camera. Also connected to the computing device 310 is a second camera 42 and second drone 40, which carries the second camera. A headset 64, worn by a director is also connected to the computing device 310. Also connected to the computing device 310 is a third camera 54 and third drone 52, which carries the third camera, where either or both of the third camera and third drone are controlled manually. The drones are ideally capable of sustaining short-range, long-duration flights with stability and precision while carrying a video camera. A further headset 58, worn by a cameraman that operates the third drone and/or third camera, is also connected to the computing device 310, as is the controller 60 that the cameraman uses to control the third drone and/or third camera.

The system 300 provides active modelling, simulation, and control of one or more drones, one or more subjects, and/or the environment. The system 300 also provides a closed computing loop from subject to camera, allowing automatic contextual events to be triggered. Furthermore, the system 300 provides for scalable and flexible drone behavior management.

Figure 13:
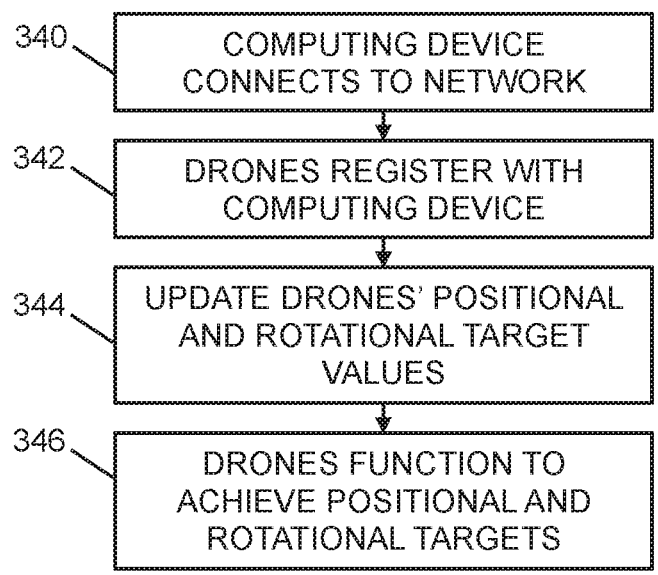
FIG. 13 is a flowchart of the technical steps that the system of coordinated drones takes, according to an embodiment of the present invention.

FIG. 13 shows a flowchart of the technical steps that the system 300 takes. In step 340, the computing device 310 connects to a wireless network and begins executing a host application 318. In step 342, the drones 34, 40 connect to the wireless network and register themselves with the host application 318. In step 344, the computing device 310 repeatedly updates the drones' target positions and rotational values, as calculated by the internal cinematic heuristics and desired camera effects. In step 346, the drones 34, 30 regulate their on-board functions to achieve the target positional and rotational values, as measured by either inside-out tracking (onboard-image based transform resolution), or outside-in tracking (external tracking system data input).

E. Variations

While the present embodiments include the best presently contemplated mode of carrying out the subject matter disclosed and claimed herein, other embodiments are possible.

Depth cameras may be used to complement traditional cameras to create full, 3D video actor representations.

Multiple actors may be filmed, each at their own acting station remote from any other. They may even have a greenscreen set up in their home. Live performances from remote locations can be combined simultaneously into a scene.

The set in which the actor is filmed does not need to be a green screen set but may instead be a real set that provides a background that remains in the final footage. Where a green screen has been shown, other methods of background removal may be employed without the use of a green screen, such as static subtraction.

In some embodiments, there may not be a designated set, and instead the actor is free to traverse the physical world. In this scenario, the routines used by the drones will include logic to analyze and adapt to a new location.

The system may be used either on the fly to create final footage, or it may be used to create footage which is post processed.

AR headsets may be used by the users of the system instead of VR headsets.

In some embodiments, drone trajectories may be reconfigured while the drone is in flight.

In some embodiments, users of the system may be provided a programmable software interface for the drone's trajectory, allowing the users to create even more complex trajectories than those provided by the system by default.

In general, unless otherwise indicated, singular elements may be in the plural and vice versa with no loss of generality. The use of a specific gender can refer to masculine, feminine or both.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention (e.g. it is known to use sensors for detecting positions and relative positions). Accordingly, the specification is to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Two or more steps in the flowcharts may be performed in a different order, other steps may be added, or one or more may be removed without altering the main function of the invention. Flowcharts from different figures may be combined in different ways. Modules may be divided into constituent modules or combined into larger modules. Screen shots may show more or less than the examples given herein. All configurations described herein are examples only and depend on the specific embodiment. Accordingly, the scope of the invention is to be construed in accordance with the substance defined by the following claims.

The invention claimed is:

1. A method for videoing a subject comprising the steps of:
    programming a drone with a trajectory parameter, the drone carrying a camera;
    coordinating the drone with the subject;
    determining a flight path for the drone that is defined by the trajectory parameter;
    adjusting the flight path of the drone to:
        avoid a collision with a further drone carrying a further camera, the further drone being coordinated with the subject; and
        prevent a virtual object, which is in a virtual scene into which an image of the subject is composited, from blocking a virtual view of the composited image from the camera as if the camera were in the virtual scene at a location corresponding to its relative location from the subject; and
    filming the subject with the camera while the drone is flying on the adjusted flight path.

2. The method of claim 1 comprising, simultaneously with filming the subject with the camera, filming the subject with the further camera.

3. The method of claim 2, further comprising receiving an Action command upon which the camera and further camera start to film the subject simultaneously.

4. The method of claim 2, wherein the image is composited into the virtual scene as a holographic representation of the subject, the method comprising creating the holographic representation and compositing the holographic representation into the virtual scene.

5. The method of claim 1, wherein adjusting the flight path comprises, before filming the subject:
    predicting that the flight path will result in a collision between the drone and the further drone; and
    adjusting the flight path to avoid the collision.

6. The method of claim 1, wherein the flight path is further adjusted to avoid a virtual collision between the drone and another virtual object in virtual scene, as if the drone were in the virtual scene at the location.

7. The method of claim 6, wherein the further adjustment occurs before filming the subject.

8. The method of claim 1, wherein the flight path is further adjusted to prevent the further drone from blocking a view of the subject from the camera.

9. The method of claim 1, wherein the flight path is further adjusted to prevent the drone from blocking a view of the subject from the further camera.

10. The method of claim 1, wherein the trajectory parameter is a straight line, an arc, a complex arc, a fixed distance from a reference point, a fixed angle from a reference point, a fixed position, or a sequence of any combination thereof.

11. The method of claim 1, wherein the trajectory parameter is reactive to a behavior of the subject.

12. The method of claim 1, wherein coordinating the drone with the subject comprises one or more of:
    aiming the camera at the subject at all points in the adjusted flight path;
    maintaining the camera at a fixed distance from the subject at all points in the adjusted flight path;
    maintaining the camera at a fixed angle from the subject at all points in the adjusted flight path; and
    maintaining the camera at a fixed distance from a portion of the subject at all points in the adjusted flight path.

13. The method of claim 1, comprising further adjusting the flight path to avoid a collision with a manually controlled third drone that is carrying a third camera which is filming the subject.

14. The method of claim 13, comprising controlling a position of the third drone in response to a scaled position of a controller.

15. The method of claim 1, comprising assigning a priority to the drone that is lower than a priority assigned to the further drone.

16. The method of claim 1, wherein the flight path is adjusted in real time.

17. The method of claim 1, comprising:
capturing a further image of the subject with the further camera; and
displaying, in a virtual reality (VR) headset, a VR scene into which the further image of the subject is composited;
wherein the further image is captured by the further camera from a perspective that corresponds to a location of a wearer of the VR headset relative to the composited further image in the VR scene;
wherein, as the wearer of the VR headset moves around in the VR scene, the further drone moves so that the perspective changes in correspondence with changes in the location of the wearer in the VR scene.

18. One or more non-transitory computer readable media comprising computer readable instructions which, when executed by one or more processors, cause the processors to:
program a drone with a trajectory parameter, the drone carrying a camera;
coordinate the drone with a subject;
determine a flight path for the drone that is defined by the trajectory parameter;
adjust the flight path of the drone to:
avoid a collision with a further drone carrying a further camera, the further drone being coordinated with the subject; and
prevent a virtual object, which is in a virtual scene into which an image of the subject is composited, from blocking a virtual view of the composited image from the camera as if the camera were in the virtual scene at a location corresponding to its relative location from the subject; and
control the camera to film the subject while the drone is flying on the adjusted flight path.

19. A system for videoing a subject comprising:
a drone programmed with a trajectory parameter, wherein the drone is coordinated with a subject;
a camera on the drone;
a computer readable memory storing a flight path for the drone that is defined by the trajectory parameter; and
a further drone carrying a further camera, the further drone being coordinated with the subject;
wherein the flight path of the drone is adjusted to:
avoid a collision with the further drone; and
prevent a virtual object, which is in a virtual scene into which an image of the subject is composited, from blocking a virtual view of the composited image from the camera as if the camera were in the virtual scene at a location corresponding to its relative location from the subject;
wherein the subject is filmed with the camera while the drone is flying on the adjusted flight path and while the further camera is filming the subject.

20. The system of claim 19, wherein the flight path is further adjusted to:
avoid a virtual collision between the drone and another virtual object in the virtual scene;
prevent the further drone from blocking a view of the subject from the camera; and
prevent the drone from blocking a view of the subject from the further camera.

* * * * *